United States Patent
Kang et al.

(10) Patent No.: US 9,813,483 B2
(45) Date of Patent: Nov. 7, 2017

(54) METHOD AND SYSTEM FOR DOWNLOADING APPLICATION, DOWNLOADING TERMINAL, SHARING TERMINAL, AND STORAGE MEDIUM

(71) Applicant: TENCENT TECHNOLOGY (SHENZHEN) COMPANY LIMITED, Shenzhen, Guangdong (CN)

(72) Inventors: Bin Kang, Guangdong (CN); Qi Chen, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 533 days.

(21) Appl. No.: 14/334,204

(22) Filed: Jul. 17, 2014

(65) Prior Publication Data
US 2014/0330895 A1 Nov. 6, 2014

Related U.S. Application Data

(63) Continuation of application No. PCT/CN2013/091000, filed on Dec. 31, 2013.

(30) Foreign Application Priority Data

Mar. 7, 2013 (CN) .......................... 2013 1 0073123

(51) Int. Cl.
*G06F 15/16* (2006.01)
*H04L 29/08* (2006.01)
*H04W 4/00* (2009.01)

(52) U.S. Cl.
CPC ........ *H04L 67/06* (2013.01); *H04L 29/08117* (2013.01); *H04L 29/08306* (2013.01); *H04W 4/00* (2013.01)

(58) Field of Classification Search
CPC ............. H04L 45/563; H04L 29/08306; H04L 29/08117; H04L 67/06; G06F 8/60–8/61; H04W 4/00
See application file for complete search history.

(56) References Cited

U.S. PATENT DOCUMENTS

| | | | |
|---|---|---|---|
| 6,446,109 B2* | 9/2002 | Gupta | G06F 9/54 |
| | | | 709/203 |
| 8,028,091 B1* | 9/2011 | Kleinfelter | H04L 29/12066 |
| | | | 709/204 |

(Continued)

FOREIGN PATENT DOCUMENTS

| | | |
|---|---|---|
| CN | 101159576 A | 4/2008 |
| CN | 101753629 A | 6/2010 |
| CN | 102541931 A | 7/2012 |

OTHER PUBLICATIONS

International Search Report dated Apr. 3, 2014 in International Application No. PCT/CN2013/091000 (3 pages).

*Primary Examiner* — Brendan Higa
(74) *Attorney, Agent, or Firm* — Anova Law Group, PLLC (57) ABSTRACT

The present invention provides a method and system for downloading an application, a downloading terminal, a sharing terminal, and a storage medium, in which the method includes: sending an application sharing request to a sharing terminal by a downloading terminal, to obtain application information of the sharing terminal; receiving, by the sharing terminal, the application sharing request sent by the downloading terminal, and sending the application information of the sharing terminal to the downloading terminal; and downloading the corresponding application by the downloading terminal according to the application information sent by the sharing terminal. According to the invention, the promotion of the applications can be targeted, (Continued)

such that the application with a better user experience in sharing terminal is recommended to the downloading terminal, thus improving the promotion efficiency of the application, while not causing the adverse effect to terminal which downloads the application.

6 Claims, 7 Drawing Sheets

(56) References Cited

U.S. PATENT DOCUMENTS

| | | | |
|---|---|---|---|
| 8,458,098 B1* | 6/2013 | Scardino | G06F 8/61 705/51 |
| 2002/0032763 A1* | 3/2002 | Cox | G06F 9/4443 709/223 |
| 2003/0074472 A1* | 4/2003 | Lucco | H04L 29/12066 709/245 |
| 2006/0080659 A1* | 4/2006 | Ganji | G06F 8/61 717/178 |
| 2010/0146442 A1* | 6/2010 | Nagasaka | G06Q 10/10 715/810 |
| 2010/0312817 A1* | 12/2010 | Steakley | G06F 8/61 709/202 |
| 2011/0010704 A1* | 1/2011 | Jeon | G06F 8/61 717/178 |
| 2012/0254919 A1* | 10/2012 | Wang | H04N 7/17309 725/51 |
| 2013/0325573 A1* | 12/2013 | Park | G06Q 30/0241 705/14.16 |
| 2014/0059536 A1* | 2/2014 | Hiratsuka | G06F 8/61 717/178 |
| 2016/0285821 A1* | 9/2016 | Zhang | H04L 61/1511 |

* cited by examiner

METHOD AND SYSTEM FOR DOWNLOADING APPLICATION, DOWNLOADING TERMINAL, SHARING TERMINAL, AND STORAGE MEDIUM

This application claims priority to and a continuation of PCT/CN2013/091000, filed on Dec. 31, 2013 and entitled "METHOD AND SYSTEM FOR DOWNLOADING APPLICATION, DOWNLOADING TERMINAL, SHARING TERMINAL, AND STORAGE MEDIUM", which claims the benefit of Chinese Patent Application No. 201310073123.3, filed with the Chinese Patent Office on Mar. 7, 2013 by TENCENT TECHNOLOGY (SHENZHEN) CO., LTD. and titled "METHOD AND SYSTEM FOR DOWNLOADING APPLICATION, DOWNLOADING TERMINAL AND SHARING TERMINAL", the contents of which are incorporated herein by reference in their entirety.

TECHNICAL FIELD

The present invention relates to the field of application technologies, in particular, to a method and system for downloading an application, a downloading terminal, a sharing terminal, and a storage medium.

TECHNICAL BACKGROUND

With the increasing of applications, applications are downloaded and installed on terminals more and more frequently, and clients are more dependent on the applications.

In the prior art, the developed applications are generally uploaded to the backend server by the operator, and then managed by the backend server. For example, the backend server on the Android operating system consolidatedly manages each application that is developed by the operator and uploaded to the backend server, for example, the backend server sorts and displays the applications, and shows applications with versatility in better positions for the sake of easy downloading and installing on the client.

However, the above-described manner is disadvantageous in that, for example, due to the great diversity of applications even in the same field, when selecting and downloading an application to the client, a user needs to download many applications one by one for trial, until the satisfying application is found, which undoubtedly reduces the promotion efficiency of the applications and degrades the user experience; moreover, the presence of some rogue applications would cause an adverse effect to the terminal during the trial.

In summary, there are the following technical problems in the prior art that: the promotion of the applications is less targeted, resulting in a low promotion efficiency, and an adverse effect is likely caused to the terminal which downloads the application.

SUMMARY OF THE INVENTION

The object of the embodiments of the invention is to provide a method and system for downloading an application, a downloading terminal, a sharing terminal, and a storage medium, which aim to solve the technical problems in the prior art that the promotion of the applications is less targeted, resulting in a low promotion efficiency, and an adverse effect is likely caused to the terminal which downloads the application.

In a first aspect, the present invention provides a method for downloading an application, including:

sending an application sharing request to a sharing terminal by a downloading terminal, to obtain application information of the sharing to terminal;

receiving, by the sharing terminal, the application sharing request sent by the downloading terminal, and sending the application information of the sharing terminal to the downloading terminal; and downloading the corresponding application by the downloading terminal according to the application information sent by the sharing terminal.

In a second aspect, the present invention provides a system for downloading an application, including a downloading terminal and a sharing terminal, in which, the downloading terminal is configured for sending an application sharing request to the sharing terminal to obtain application information of the sharing terminal, and downloading the corresponding application according to the application information sent by the sharing terminal; and the sharing terminal is configured for receiving the application sharing request sent by the downloading terminal and sending the application information of the sharing terminal to the downloading terminal.

In a third aspect, the present invention provides a downloading terminal, at least a processor operating in conjunction with a memory and a plurality of units, the plurality of units comprise:

a request sending module, which is configured for sending an application sharing request to a sharing terminal to obtain application information of the sharing terminal; and a downloading module, which is configured for downloading the corresponding application according to the application information sent by the sharing terminal.

In a fourth aspect, the present invention provides a sharing terminal, at least a processor operating in conjunction with a memory and a plurality of units, the plurality of units comprise:

a request receiving module, which is configured for receiving an application sharing request sent by a downloading terminal; and a sending module, which is configured for sending application information of the sharing terminal to the downloading terminal.

In a fifth aspect, the invention provides a storage medium containing computer executable instructions, with the computer executable instructions for executing a method for downloading an application when executed by a computer processor, wherein the method includes:

sending an application sharing request to a sharing terminal by a downloading terminal to obtain application information of the sharing terminal;

receiving, by the sharing terminal, the application sharing request sent by the downloading terminal, and sending the application information of the sharing terminal to the downloading terminal; and downloading the corresponding application by the downloading terminal according to the application information sent by the sharing terminal.

In the embodiments of the invention, the downloading terminal can obtain the application information on the sharing terminal therefrom, and then download the corresponding application according to the obtained application information, for example, directly download the application from the sharing terminal. Obviously, according to the embodiments of the invention, the promotion of the applications can be targeted, such that the application with a better user experience in sharing terminal is recommended to the downloading terminal, thus improving the promotion efficiency of the application, while not causing the adverse effect to terminal which downloads the application.

To make above contents of the present invention more apparent, the preferred embodiment are illustrated below in conjunction with the drawings.

DESCRIPTION OF DRAWINGS

In order to clearly explain the technical solutions of the embodiments of the invention, the figures used in the descriptions of the embodiments are briefly introduced as follows. Obviously, the figures in the following descriptions only show some embodiments of the invention, and modifications and substitutions can also be made to these figures by those skilled in the art without any creative work.

DETAILED DESCRIPTION OF THE PREFERRED EMBODIMENT

The technical solutions in the embodiments of the invention are clearly and completely described below in combination with the drawings. Obviously, the described embodiments are some instead of all embodiments of the invention, and are provided to set forth the principle of the invention instead of limiting the invention to the specific embodiments. All other embodiments obtained in light of the described embodiments of the invention by those skilled in the art without any creative work should fall within the scope of the invention.

Figure 1:
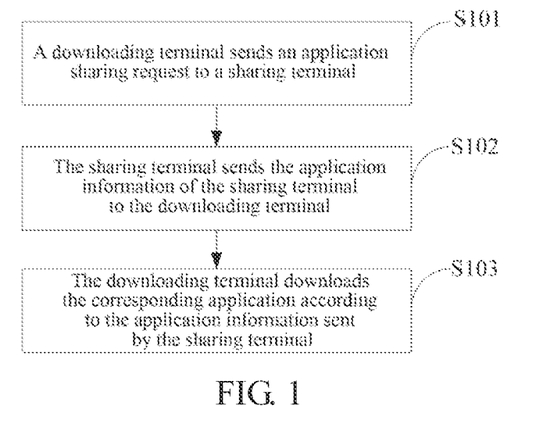
FIG. 1 is a schematic flow diagram of a first embodiment of the method for downloading an application provided by the present invention.

Reference is made to FIG. 1, which is a schematic flow diagram of a first embodiment of the method for downloading an application provided by the invention.

In Step S101, a downloading terminal sends an application sharing request to a sharing terminal to obtain application information of the sharing terminal.

In the specific implementation, the downloading terminal may be connected with the sharing terminal in a wireless manner. Specifically, according to its IP address, the downloading terminal can obtain the corresponding network address type, which, for example, indicates a Wireless Fidelity (Wi-Fi) network with a username of "SHARE". Then, the downloading terminal sends a User Datagram Protocol (UDP) request to the sharing terminal within the Wi-Fi network, in order to establish the connection to the sharing terminal. The sharing terminal sends its IP address and other information to the downloading terminal after receiving the UDP request sent by the downloading terminal. Thereby, all sharing terminals within the Wi-Fi network with the username of "SHARE" can be searched out by the downloading terminal. Of course, in order to meet the requirements for performance and speed, for example, some network parameters shall be adjusted for UDP, which is well known in the art and will not be discussed in detail here.

In Step S102, the sharing terminal receives the application sharing request sent by the downloading terminal, and sends the application information of the sharing terminal to the downloading terminal.

In the present embodiment, the application information may indicate the applications on the sharing terminal, such as applications including WeChat, Billiard games and so on that are downloaded and installed onto the sharing terminal. Further, the sharing terminal can send to the downloading terminal a list showing the applications downloaded and installed onto the sharing terminal.

In Step S103, the downloading terminal downloads the corresponding application according to the application information sent by the sharing terminal.

Figure 2:
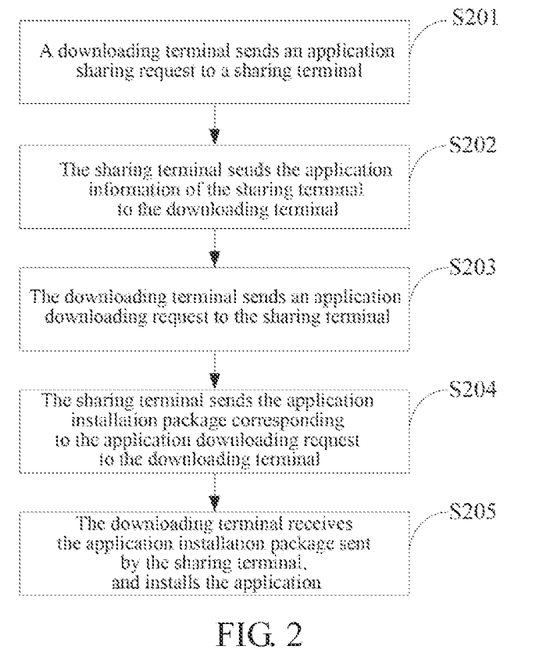
FIG. 2 is a schematic flow diagram of a second embodiment of the method for downloading an application provided by the present invention.

Refer is made to FIG. 2, which is a schematic flow diagram of a second embodiment of the method for downloading an application provided by the present invention.

In Step S201, a downloading terminal sends an application sharing request to a sharing terminal to obtain application information of the sharing terminal.

In Step S202, the sharing terminal receives the application sharing request sent by the downloading terminal, and sends the application information of the sharing terminal to the downloading terminal.

In Step S203, the downloading terminal receives the application information sent by the sharing terminal, and sends an application downloading request to the sharing terminal to download the corresponding application installation package.

In the specific implementation, the user of the downloading terminal is allowed to choose and download any interested application after the downloading terminal receives the application information sent by the sharing terminal.

In Step S204, the sharing terminal receives the application downloading request sent by the downloading terminal, and sends the application installation package corresponding to the application downloading request to the downloading terminal.

In Step S205, the downloading terminal receives the application installation package sent by the sharing terminal, and installs an application corresponding to the application installation package.

Figure 3:
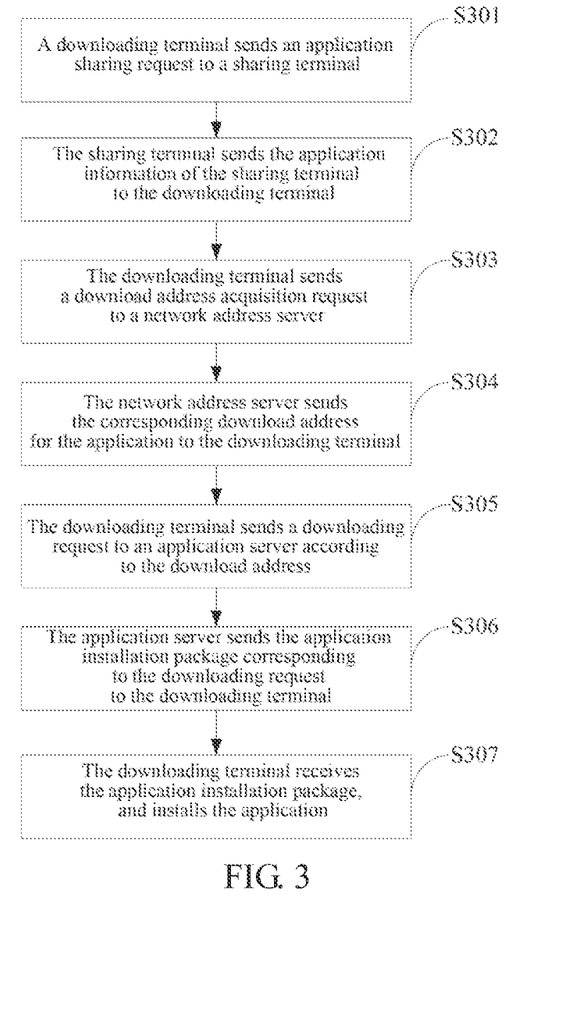
FIG. 3 is a schematic flow diagram of a third embodiment of the method for downloading an application provided by the present invention.

Reference is made to FIG. 3, which is a schematic flow diagram of a third embodiment of the method for downloading an application provided by the present invention.

In Step S301, a downloading terminal sends an application sharing request to a sharing terminal to obtain application information of the sharing terminal.

In Step S302, the sharing terminal receives the application sharing request sent by the downloading terminal, and sends the application information of the sharing terminal to the downloading terminal, where the application information indicates the applications on the sharing terminal.

In Step S303, according to the application information received from the sharing terminal, the downloading terminal sends a download address acquisition request to a network address server, in order to obtain the download address for the application.

In Step S304, the network address server receives the download address acquisition request sent by the downloading terminal, and sends the corresponding download address for the application to the downloading terminal.

In Step S305, the downloading terminal receives the download address sent by the network address server, and sends a downloading request to an application server according to the download address, in order to download the corresponding application installation package.

In Step S306, the application server receives the downloading request sent by the downloading terminal, and sends the application installation package corresponding to the downloading request to the downloading terminal.

In Step S307, the downloading terminal receives the application installation package sent by the application server, and installs an application corresponding to the application installation package.

Figure 4:
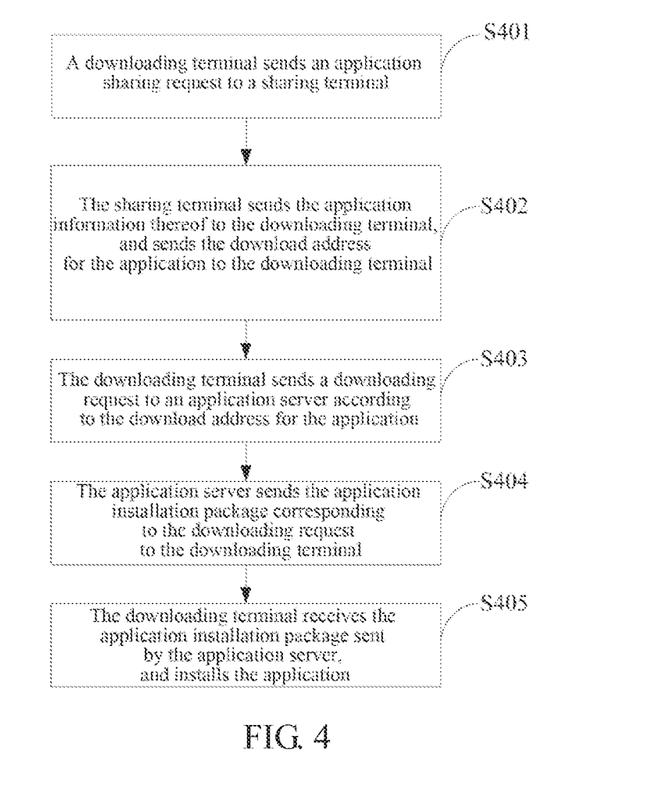
FIG. 4 is a schematic flow diagram of a fourth embodiment of the method for downloading an application provided by the present invention.

Reference is made to FIG. 4, which is a schematic flow diagram of a fourth embodiment of the method for downloading an application provided by the present invention.

In Step S401, a downloading terminal sends an application sharing request to a sharing terminal to obtain application information of the sharing terminal.

In Step S402, the sharing terminal sends the application information thereof to the downloading terminal, and sends the download address for the application to the downloading terminal.

In Step S403, the downloading terminal sends a downloading request to an application server according to the download address for the application, in order to download the corresponding application installation package.

In Step S404, the application server receives the downloading request sent by the downloading terminal, and sends the application installation package corresponding to the downloading request to the downloading terminal.

In Step S405, the downloading terminal receives the application installation package sent by the application server, and installs the application corresponding to the application installation package.

Figure 5:
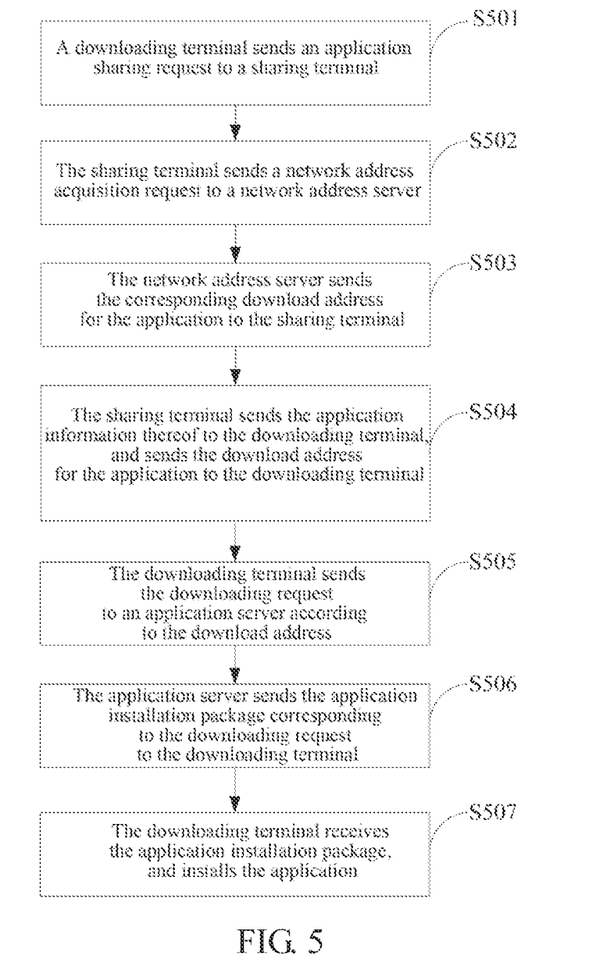
FIG. 5 is a schematic flow diagram of a fifth embodiment of the method for downloading an application provided by the present invention.

Reference is made to FIG. 5, which is a schematic flow diagram of a fifth embodiment of the method for downloading an application provided by the present invention.

In step S501, a downloading terminal sends an application sharing request to a sharing terminal to obtain application information of the sharing terminal.

In Step S502, the sharing terminal receives the application sharing request sent by the downloading terminal, and sends a network address acquisition request to a network address server, in order to obtain the download address for the application, where the network address acquisition request includes the application information of the sharing terminal.

In Step S503, the network address server receives the network address acquisition request sent by the sharing terminal, and sends the corresponding download address for the application to the sharing terminal.

In step S504, the sharing terminal sends the application information thereof to the downloading terminal, and sends the download address for the application to the downloading terminal.

In step S505, the downloading terminal sends the downloading request to an application server according to the download address, in order to download the corresponding application installation package.

In step S506, the application server receives the downloading request sent by the downloading terminal, and sends the application installation package corresponding to the downloading request to the downloading terminal.

In step S507, the downloading terminal receives the application installation package sent by the application server, and installs the application corresponding to the application installation package.

Figure 6:
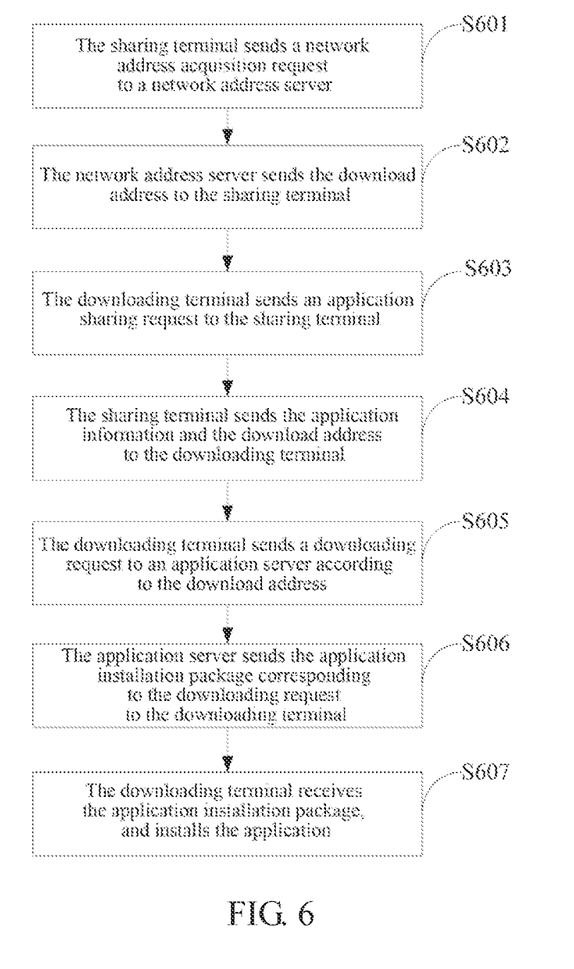
FIG. 6 is a schematic flow diagram of a sixth embodiment of the method for downloading an application provided by the present invention.

Reference is made to FIG. 6, which is a schematic flow diagram of a sixth embodiment of the method for downloading an application provided by the present invention.

In step S601, the sharing terminal sends a network address acquisition request to a network address server to obtain the download address for the application, where the network address acquisition request includes application information of the sharing terminal.

In step S602, the network address server receives the network address acquisition request sent by the sharing terminal, and sends the corresponding download address for the application to the sharing terminal.

In Step S603, the downloading terminal sends an application sharing request to the sharing terminal to obtain the application information of the sharing terminal.

In Step S604, the sharing terminal receives the application sharing request sent by the downloading terminal, sends the application information of the sharing terminal to the downloading terminal, fads the download address for the application to the downloading terminal.

In Step S605, the downloading terminal sends a downloading request to an application server according to the download address, in order to download the corresponding application installation package.

In Step S606, the application server receives the downloading request sent by the downloading terminal, and sends the application installation package corresponding to the downloading request to the downloading terminal.

In Step S607, the downloading terminal receives the application installation package sent by the application server, and installs the application corresponding to the application installation package.

Figure 7:
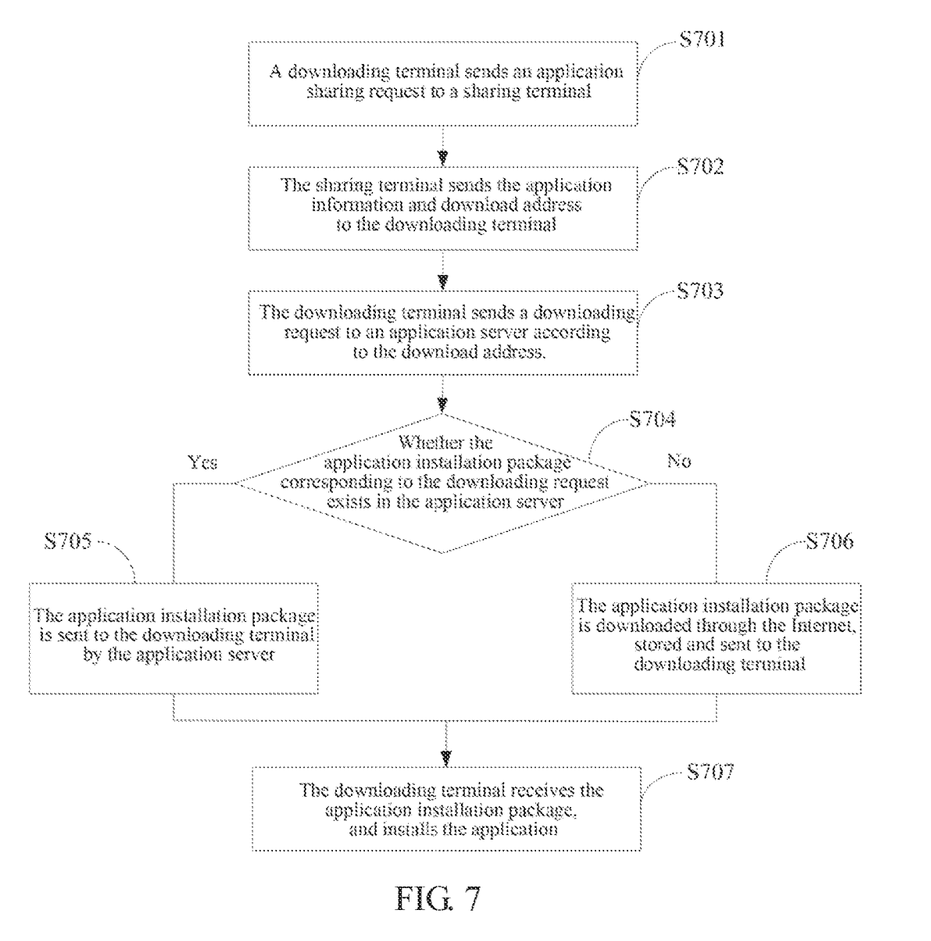
FIG. 7 is a schematic flow diagram of a seventh embodiment of the method for downloading an application provided by the present invention.

Reference is made to FIG. 7, which is a schematic flow diagram of a seventh embodiment of the method for downloading an application provided by the present invention.

In step S701, a downloading terminal sends an application sharing request to a sharing terminal to obtain application information of the sharing terminal.

In step S702, the sharing terminal receives the application sharing request sent by the downloading terminal, and sends the application information of the sharing terminal to the downloading terminal, where the application information indicates the applications on the sharing terminal.

In step S703, the downloading terminal sends a downloading request to an application server, in order to download the corresponding application installation package.

In Step S704, the application server receives the downloading request sent by the downloading terminal, and determines whether the application installation package corresponding to the downloading request exists in the application server, and if so, Step S705 is performed; otherwise, Step S706 is performed.

In Step S705, the application installation package is directly sent to the downloading terminal.

In Step S706, the application installation package is downloaded through the Internet, stored and sent to the downloading terminal.

In Step S707, the downloading terminal receives the application installation package sent by the sharing terminal, and installs the application corresponding to the application installation package.

Figure 8:
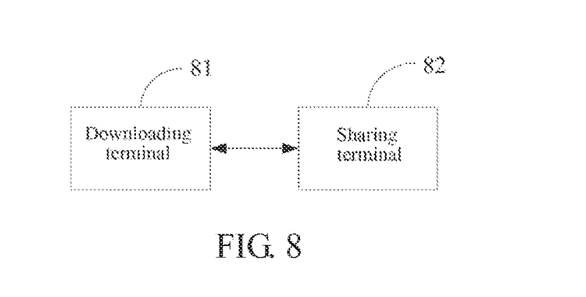
FIG. 8 is a schematic structural diagram showing a first embodiment of the system for downloading an application provided by the present invention.

Reference is made to FIG. 8, which is a schematic structural diagram showing a first embodiment of the system for downloading an application provided by the present invention, and the system can be used for performing the method for do loading an application as provided in connection with the above FIGS. 1 to 7, and includes a downloading terminal 81 and a sharing terminal 82.

The downloading terminal 81 sends an application sharing request to the sharing terminal 82 to obtain application information of the sharing terminal 82. The sharing terminal 82 receives the application sharing request sent by the downloading terminal 81, and sends the application information of the sharing terminal 82 to the downloading terminal 81, where the application information indicates the applications on the sharing terminal 82.

The downloading terminal 81 receives the application information sent by the sharing terminal 82 and sends an application downloading request to the sharing terminal 82 to download the corresponding application installation package. The sharing terminal 82 receives the application downloading request sent by the downloading terminal 81, and sends the application installation package corresponding to the application downloading request to the downloading terminal 81. The downloading terminal 81 receives the application installation package sent by the sharing terminal 82, and installs the application corresponding to the application installation package.

Figure 9:
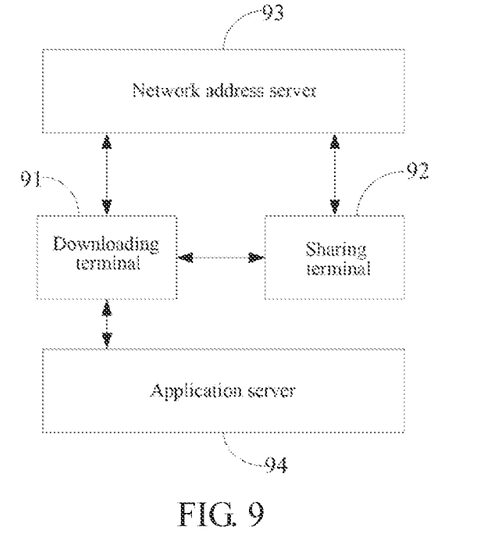
FIG. 9 is a schematic structural diagram showing a second embodiment of the system for downloading an application provided by the present invention.

Reference is made to FIG. 9, which is a schematic structural diagram showing a second embodiment of the system for downloading an application provided by the present invention, and the system can be used for performing the method for downloading an application as provided in the above FIGS. 1 to 7 and includes a downloading terminal 91 and a sharing terminal 92, a network address server 93, and an application server 94.

The downloading terminal 91 sends an application sharing request to the sharing terminal 92 to obtain application information of the sharing terminal 92. The sharing terminal 92 receives the application sharing request sent by the downloading terminal 91, and sends the application information of the sharing terminal 92 to the downloading terminal 91.

The downloading terminal 91 receives the application information sent by the sharing terminal 92, and sends a download address acquisition request to the network address server 93 according to the received application information, order to obtain the download address for the application; the network address server 93 receives the download address acquisition request sent by the downloading terminal, and sends the corresponding download address for the application to the downloading terminal 91.

The downloading terminal 91 receives the download address sent by the network address server 93, and sends the downloading request to the application server 94 according to the download address, in order to download the corresponding application installation package. The application server 94 receives the downloading request sent by the downloading terminal, and sends the application installation package corresponding to the downloading request to the downloading terminal 91. The downloading terminal 91 receives the application installation package sent by the application server 94, and installs the application corresponding to the application installation package.

In the specific implementation, the sharing terminal 92 is also configured to send a network address acquisition request to the network address server 93 to obtain the download address for the application, where the network address acquisition request includes application information of the sharing terminal 92, such as WeChat.

The network address server 93 receives the network address acquisition request sent by the sharing terminal 92, and sends the download address for the application to the sharing terminal 92. The sharing terminal 92 sends the application information thereof to the downloading terminal 91, and sends the download address for the application to the downloading terminal 91. The downloading terminal 91 sends the downloading request to the application server 94 according to the download address, in order to download the corresponding application installation package. The application server 94 receives the downloading request sent by the downloading terminal 91, and sends the application installation package corresponding to the downloading request to the downloading terminal 91.

In the specific implementation, the downloading terminal 91 receives the application information sent by the sharing terminal 92, and can also directly send the downloading request to the application server 94 according to the received application information, in order to download the corresponding application installation package. The application server 94 receives downloading request sent by the downloading terminal 91, and determines whether the application installation package corresponding to the downloading request exists in the application server 94, if so, then the application server 94 directly sends the application installation package corresponding to the downloading request to the downloading terminal 91; otherwise, the application server 94 downloads the application installation package corresponding to the downloading request through the Internet, stores the downloaded application installation package, and sends the downloaded application installation package to the downloading terminal 91.

Figure 10:
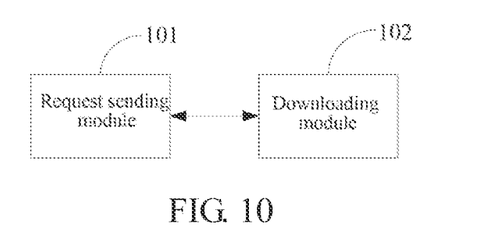
FIG. 10 is a schematic structural diagram showing an embodiment of the downloading terminal provided by the present invention.

Reference is made to FIG. 10, which is a schematic structural diagram showing an embodiment of the downloading terminal provided by the present invention, and the downloading terminal can be used for performing the method for downloading an application as provided in the above FIGS. 1 to 7, and the downloading terminal, at least a processor operating in conjunction with a memory and a plurality of units, the plurality of units comprise: a request sending module 101 and a downloading module 102.

The request sending module 101 is configured for sending an application sharing request to a sharing terminal to obtain application information of the sharing terminal. The downloading module is configured for downloading the corresponding application according to the application information sent by the sharing terminal.

In the specific implementation, according to the received application information, the downloading module 102 can download the application installation package corresponding the received application information from the sharing terminal or the application server. In downloading the corresponding application installation package from the application server, the downloading module 102 can also send a download address acquisition request to the network address server according to the application information received from the sharing terminal in order to obtain the download address for the application, and download the corresponding application installation package from the application server according to the download address. The working principle of each module in the downloading terminal can refer to the detailed description of the above system for downloading an application, and will not be discussed here.

Figure 11:
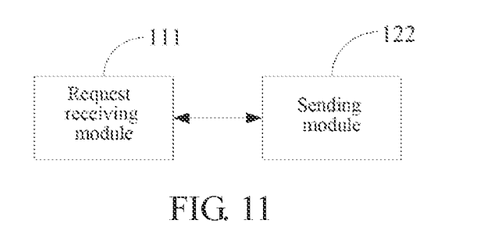
FIG. 11 is a schematic structural diagram showing an embodiment of the sharing terminal provided by the present invention.

Reference is made to FIG. 11, which is a schematic structural diagram showing an embodiment of the sharing terminal provided by the present invention, and the sharing terminal can be used for performing the method for downloading an application as provided in the above FIGS. 1 to 7, and the sharing terminal, at least a processor operating in conjunction with a memory and a plurality of units, the plurality of units comprise: a request receiving module 111 and a sending module 112.

The request receiving module 111 receives an application sharing request sent by the downloading terminal; and the sending module 112 sends application information of the sharing terminal to the downloading terminal.

Specifically, the sending module 112 can also send the corresponding application installation package or the download address for the application, to the download terminal according to the application sharing request. The working principle of each module in the sharing terminal can refer to the detailed description of the above system for downloading an application, and will not be discussed here.

In the present invention, the downloading terminal can obtain the application information on the sharing terminal therefrom, and then download the corresponding application according to the obtained application information, for example, directly download the application from the sharing terminal. Obviously according to the invention, the promotion of the applications can be targeted, such that the application with a better user experience in sharing terminal is recommended to the downloading terminal, thus improving the promotion efficiency of the application, while not causing the adverse effect to terminal which downloads the application.

The embodiment of the invention also provides a storage medium containing computer executable instructions, with the computer executable instructions for executing a method for downloading an application when executed by a computer processor, wherein the method includes:

sending an application sharing request to a sharing terminal by a downloading terminal, to obtain application information of the sharing terminal;

receiving, by the sharing terminal, the application sharing request sent by the downloading terminal, and sending the application information of the sharing terminal to the downloading terminal; and downloading the corresponding application by the downloading terminal according to the application formation sent by the sharing terminal.

With the above description of the embodiments, it can be clearly understood by those skilled in the art that the present invention may be achieved by means of software and necessary general-purpose hardware, or can also be realized by means of hardware, but in many cases the former is better. Based on this understanding, the technical solution of the invention or the part of the invention contributing to the prior art may be embodied in the form of software product, which may be stored in a computer readable storage medium such as a computer floppy disk, a Read-Only Memory (ROM), a Random Access Memory (RAM), a Flash, a hard disk or CD-ROM and the like, including several instructions for executing the method described in various embodiments of the invention by a computer device (such as a personal computer, a server, or a network device, etc.).

In summary the above preferred embodiments are described for illustrating the present invention, but shall not be interpreted as the limitation to the present invention. It is noted that variations and substitutions conceivable by those skilled in the art should fall within the scope of the protection of the present invention without departing from the sprint and scope of the present invention. Accordingly, the scope of the protection of the present invention is defined by the attached claims.

The invention claimed is:

1. A method for downloading an application, comprising:
sending an application sharing request to a sharing terminal by a downloading terminal, to obtain application information of the sharing terminal, wherein the application information of the sharing terminal includes an application list indicating one or more applications installed on the sharing terminal;

receiving, by the sharing terminal, the application sharing request sent by the downloading terminal;

sending, by the sharing terminal a network address acquisition request to a network address server, in order to obtain a download address for the one or more applications installed on the sharing terminal;

receiving, by the network address server, the network address acquisition request sent by the sharing terminal, and sending the download address for the one or more applications to the sharing terminal;

sending, by the sharing terminal, the application information to the downloading terminal, and sending the download address for the one or more applications to the downloading terminal;

sending, by the downloading terminal a downloading request to an application server according to the download address for the one or more applications, in order to download a corresponding application installation package; and receiving, by the application server, the downloading request sent by the downloading terminal, and sending the application installation package corresponding to the downloading request to the downloading terminal.

2. The method of claim 1, further comprising:
determining whether the application installation package corresponding to the downloading request exists in the application server;

if the application installation package corresponding to the downloading request exists in the application server, directly sending the application installation package to the downloading terminal; and if the application installation package corresponding to the downloading request does not exist in the application server, downloading the application installation package through the internet, wherein the application installation package is stored and sent to the downloading terminal.

3. The method of claim 1, wherein:
the downloading terminal and the sharing terminal are in a same wireless network; and
the downloading terminal communicates with the sharing terminal within the wireless network.

4. The method of claim 1, wherein downloading the at least one application in the application list further comprises:

downloading, by the downloading terminal, the at least one application based on a user selection in the application list.

5. A system for downloading an application, comprising a downloading terminal and a sharing terminal, wherein the downloading terminal is configured for:
- sending an application sharing request to the sharing terminal to obtain application information of the sharing terminal, wherein the application information of the sharing terminal includes an application list indicating one or more applications installed on the sharing terminal; and
- downloading at least one application in the application list according to the application information sent by the sharing terminal; and
- the sharing terminal is configured for receiving the application sharing request sent by the downloading terminal and sending the application information of the sharing terminal to the downloading terminal;
- wherein the system further comprises a network address server, and an application server;
- the sharing terminal is also configured for sending the network address acquisition request to the network address server to obtain a download address for the one or more applications installed on the sharing terminal;
- the network address server is also configured for receiving the network address acquisition request sent by the sharing terminal and sending the download address for the one or more applications to the sharing terminal;
- the sharing terminal is also configured for sending the application information to the downloading terminal and sending the download address for the one or more applications to the downloading terminal;
- the downloading terminal is also configured for sending the downloading request to the application server according to the download address, in order to download a corresponding application installation package; and
- the application server is also configured for receiving the downloading request sent by the downloading terminal and sending the application installation package corresponding to the downloading request to the downloading terminal.

6. The system of claim 5, wherein the application server is also configured for:
- receiving the downloading request sent by the downloading terminal, determining whether the application installation package corresponding to the downloading request exists in the application server,
- if the application installation package exists in the application server, the application server directly sends the application installation package corresponding to the downloading request to the downloading terminal;
- if the application installation package does not exist in the application server, the application server downloads the application installation package corresponding to the downloading request through the internet, stores the downloaded application installation package, and sends the downloaded application installation package to the downloading terminal.

* * * * *